United States Patent
Han et al.

(10) Patent No.: US 11,519,662 B2
(45) Date of Patent: Dec. 6, 2022

(54) VACUUM ADIABATIC BODY AND REFRIGERATOR

(71) Applicant: LG ELECTRONICS INC., Seoul (KR)

(72) Inventors: Sol Han, Seoul (KR); Daewoong Kim, Seoul (KR); Wonyeong Jung, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 16/977,698

(22) PCT Filed: Jun. 26, 2019

(86) PCT No.: PCT/KR2019/007761
§ 371 (c)(1),
(2) Date: Sep. 2, 2020

(87) PCT Pub. No.: WO2020/004953
PCT Pub. Date: Jan. 2, 2020

(65) Prior Publication Data
US 2020/0393191 A1    Dec. 17, 2020

(30) Foreign Application Priority Data

Jun. 27, 2018  (KR) .......................... 10-2018-0074264

(51) Int. Cl.
*F16L 59/065*  (2006.01)
*F25D 23/06*   (2006.01)
*F25B 13/00*   (2006.01)

(52) U.S. Cl.
CPC .......... *F25D 23/066* (2013.01); *F16L 59/065* (2013.01); *F25B 13/00* (2013.01); *F25D 2201/14* (2013.01)

(58) Field of Classification Search
None
See application file for complete search history.

(56) References Cited

U.S. PATENT DOCUMENTS

2004/0226956 A1   11/2004  Brooks
2012/0104923 A1    5/2012  Jung et al.
(Continued)

FOREIGN PATENT DOCUMENTS

CN    107923701    4/2018
EP    2 289 827    1/2015
(Continued)

OTHER PUBLICATIONS

International Search Report dated Oct. 29, 2019 issued in Application No. PCT/KR2019/007761.
(Continued)

*Primary Examiner* — Alexander S Thomas
(74) *Attorney, Agent, or Firm* — Ked & Associates, LLP

(57) ABSTRACT

Provided is a vacuum adiabatic body. The vacuum adiabatic body includes a supporting unit configured to maintain a vacuum space part. The supporting unit includes a plurality of bars extending in a vertical direction between the first plate member and the second plate member. When a pitch of the bar is a, an elastic modulus of a material forming the bar is E, and a radius of a long axis is n and a radius of a short axis is m when a cross-section of the bar has an elliptical shape is n, the following equation: is satisfied.

17 Claims, 8 Drawing Sheets

(56) References Cited

U.S. PATENT DOCUMENTS

| | | |
|---|---|---|
| 2014/0322481 A1 | 10/2014 | Song et al. |
| 2015/0030800 A1 | 1/2015 | Jung et al. |
| 2018/0224195 A1 | 8/2018 | Jung et al. |
| 2018/0224196 A1 | 8/2018 | Jung et al. |
| 2018/0224197 A1 | 8/2018 | Jung et al. |

FOREIGN PATENT DOCUMENTS

| | | |
|---|---|---|
| JP | 2008-101451 | 5/2008 |
| KR | 10-0343719 | 7/2002 |
| KR | 10-2011-0015327 | 2/2011 |
| KR | 10-2012-0106485 | 9/2012 |
| KR | 10-1456376 | 10/2014 |
| KR | 10-2015-0012712 | 2/2015 |
| KR | 10-2017-0016191 | 2/2017 |
| KR | 10-1818524 | 2/2018 |
| RU | 2252377 | 5/2005 |
| TW | I1613131 | 2/2018 |
| WO | WO 2017/023094 | 2/2017 |

OTHER PUBLICATIONS

Written Opinion dated Oct. 29, 2019 issued in Application No. PCT/KR2019/007761.
Russian Office Action dated Jul. 19, 2021 issued in Application No. 2020132156/12(058400).
Chinese Office Action dated Aug. 4, 2021 issued in Application No. 201980024439.9.
Indian Office Action dated Apr. 29, 2021 issued in IN Application No. 202017042799.

[Fig. 1]
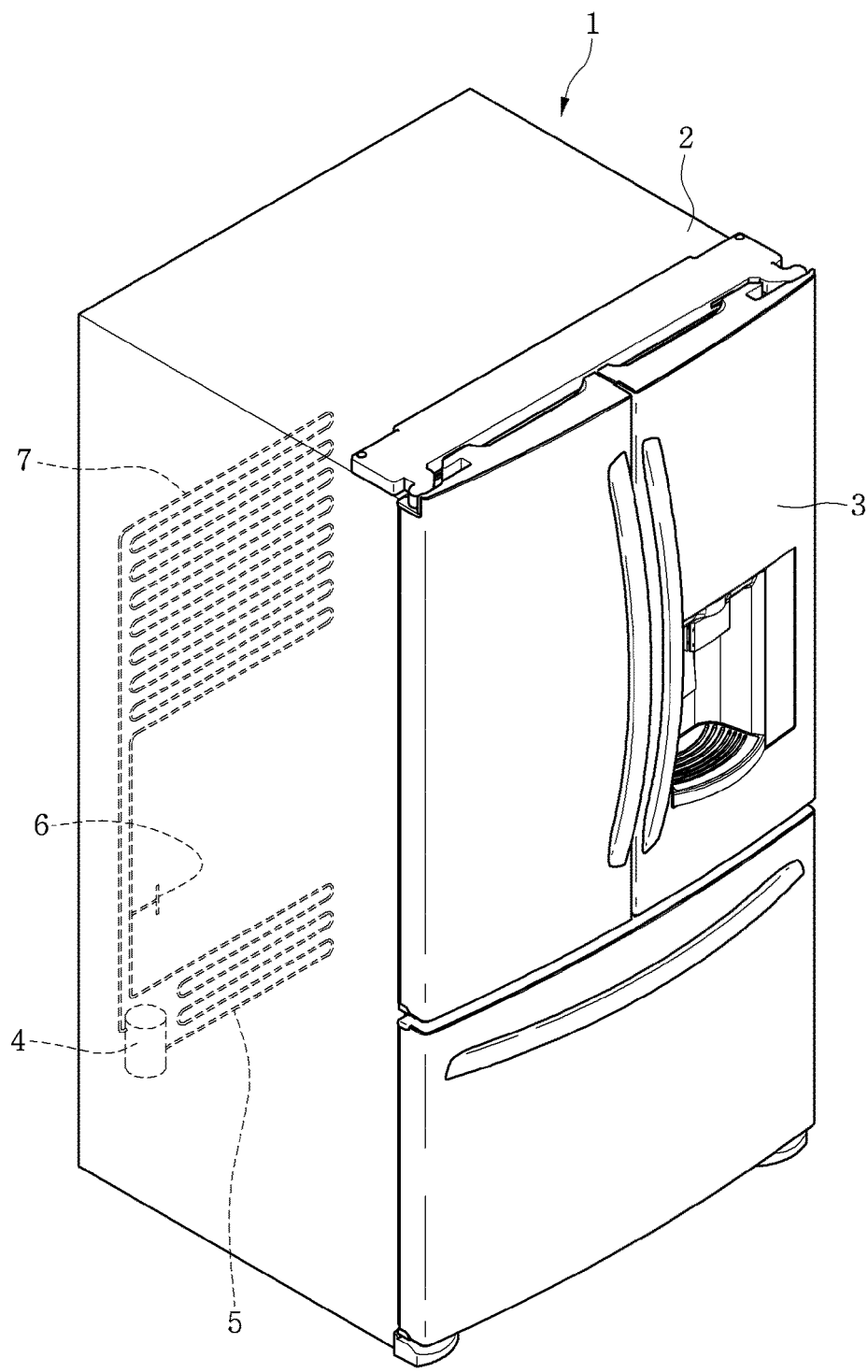

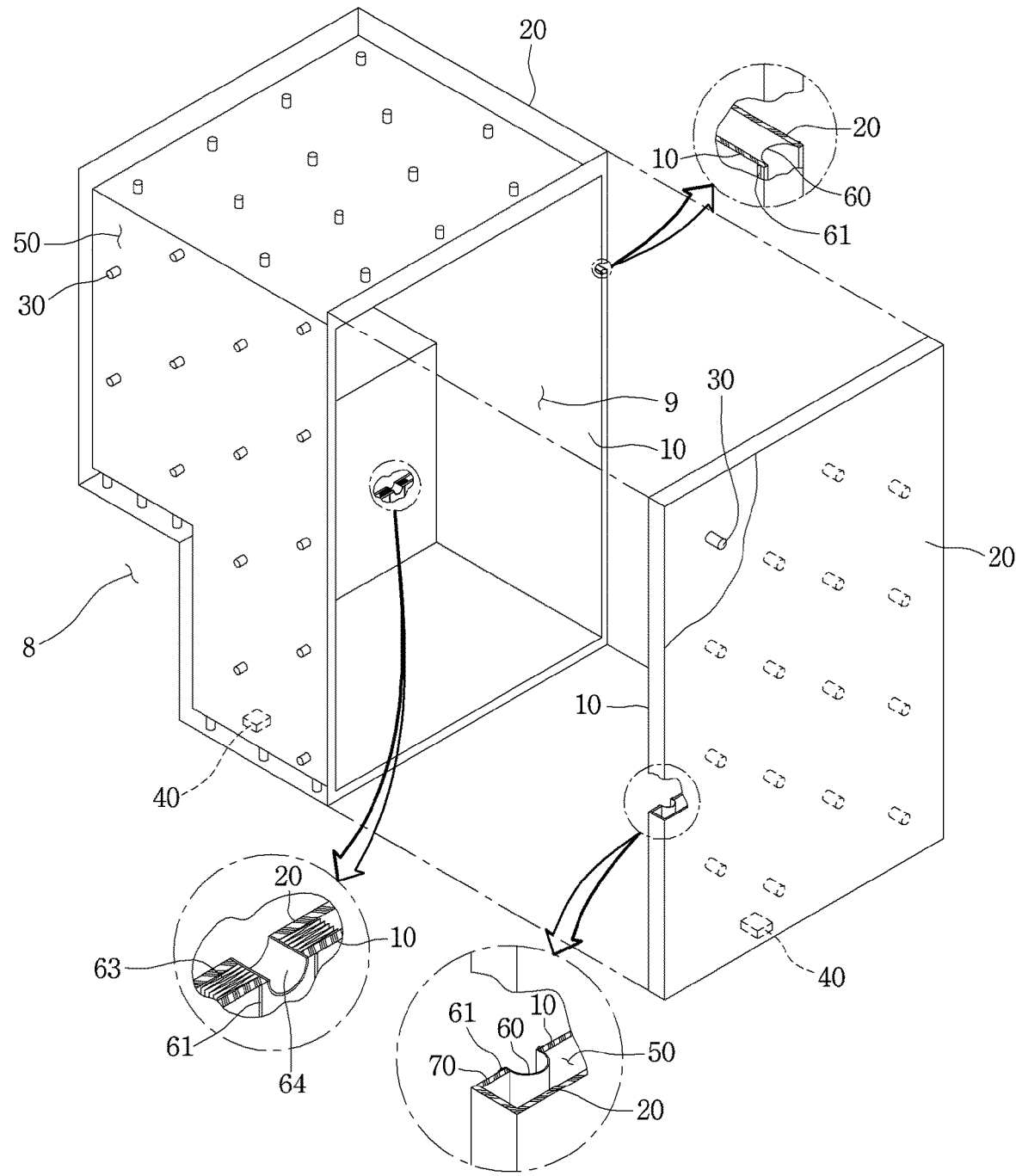
[Fig. 2]

[Fig. 3]
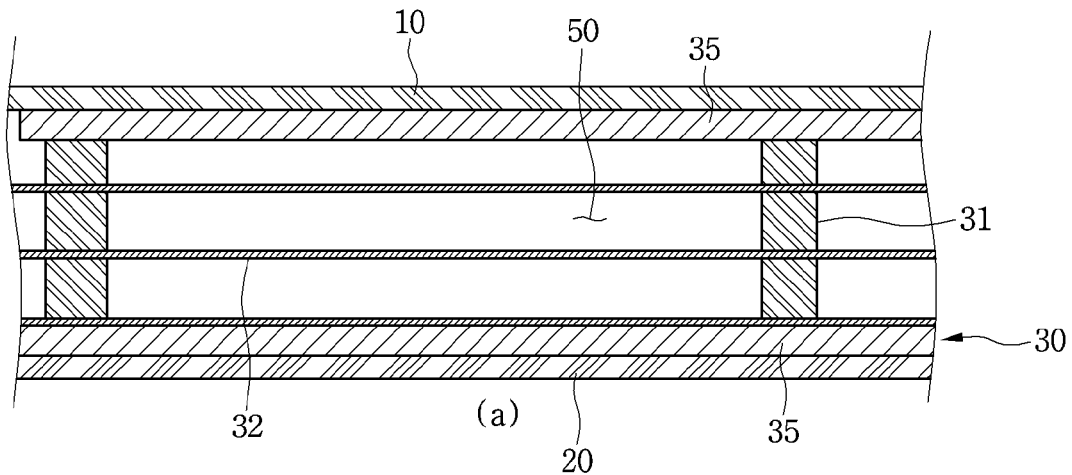
(a)
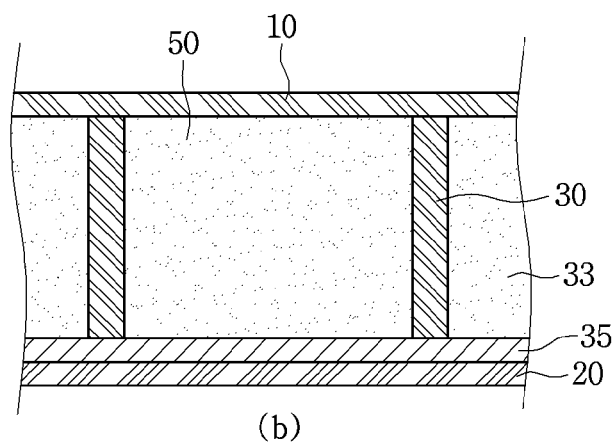
(b)
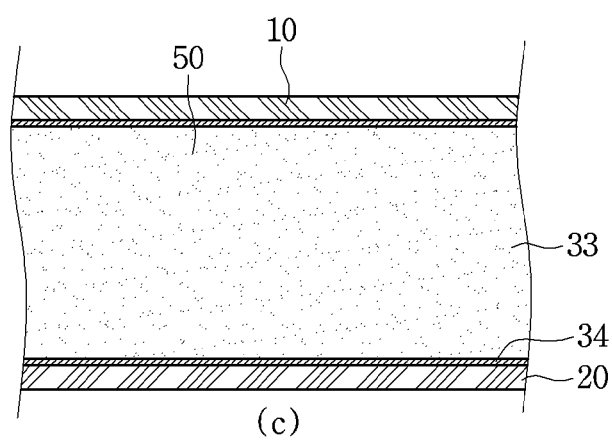
(c)

[Fig. 4]
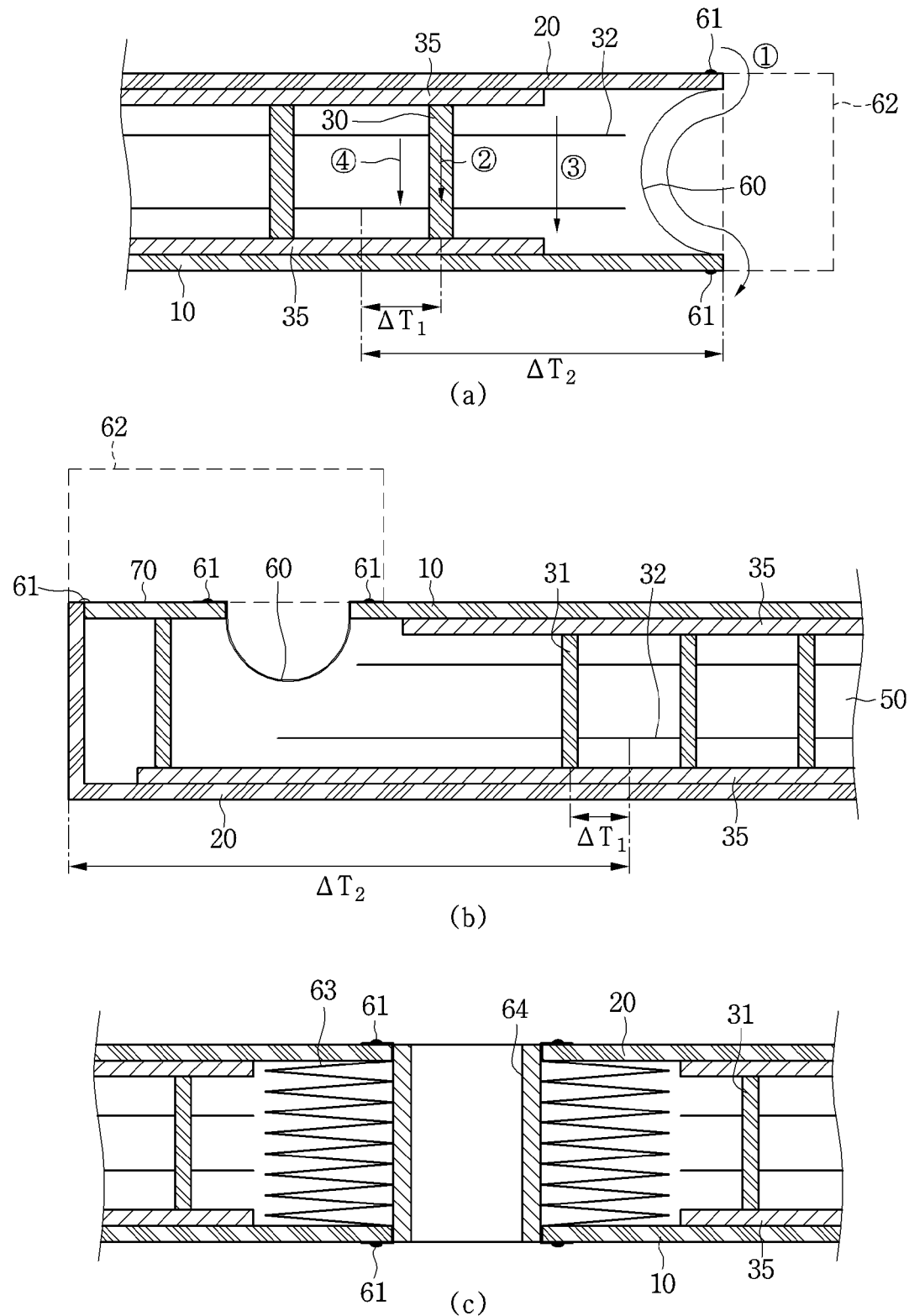

[Fig. 5]
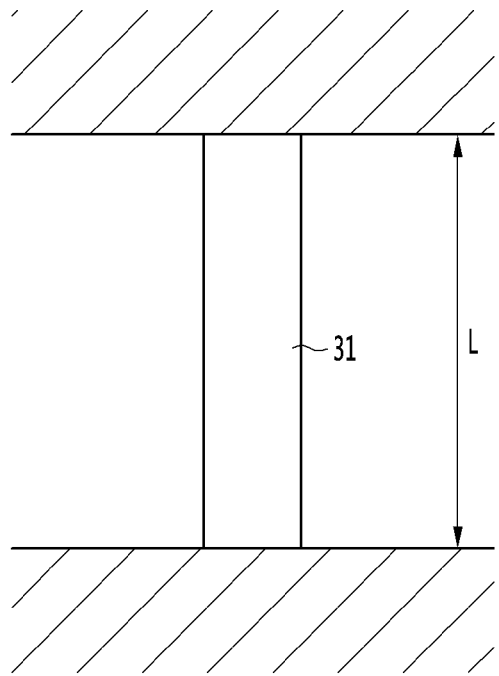
[Fig. 6]
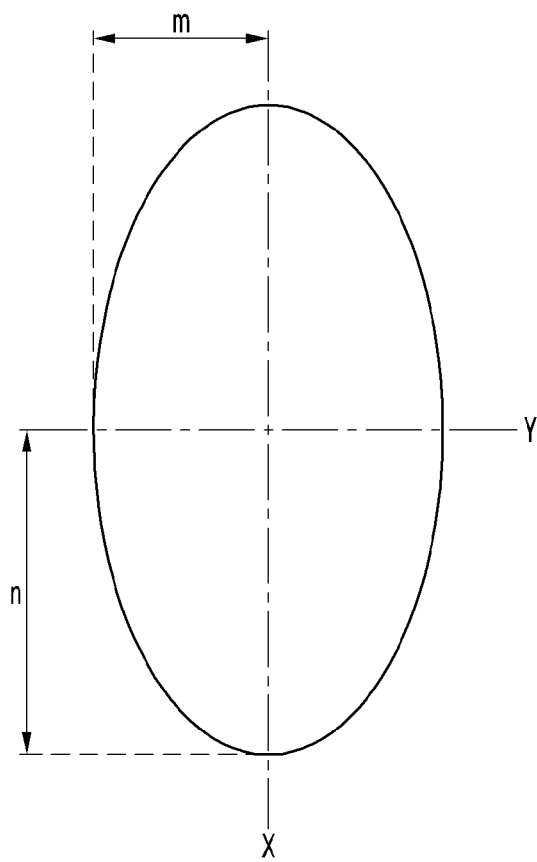

[Fig. 7]
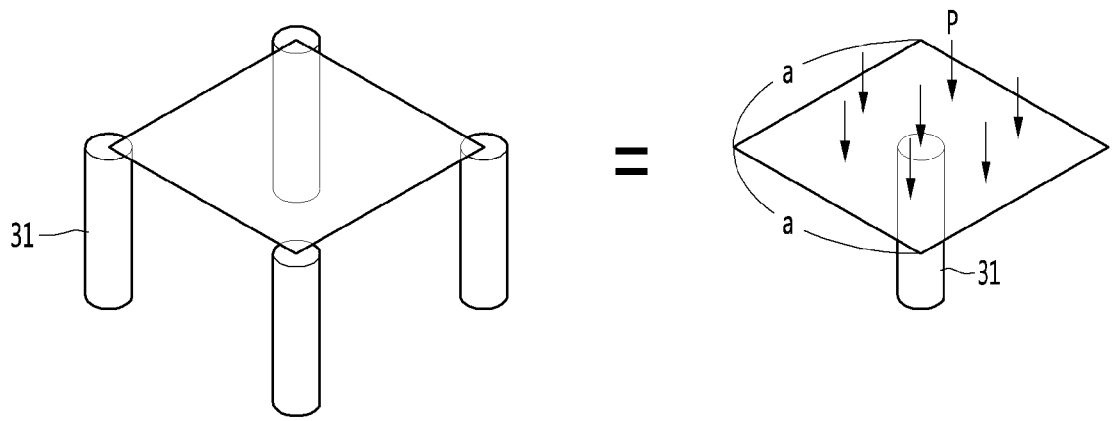
[Fig. 8]
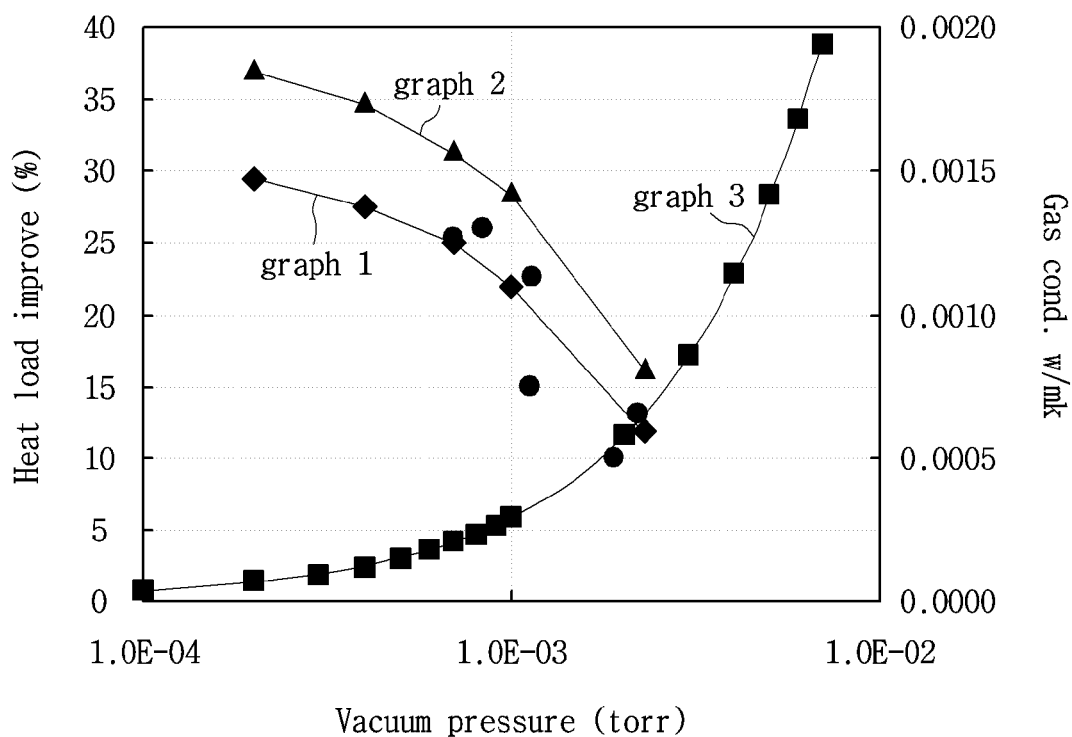

[Fig. 9]
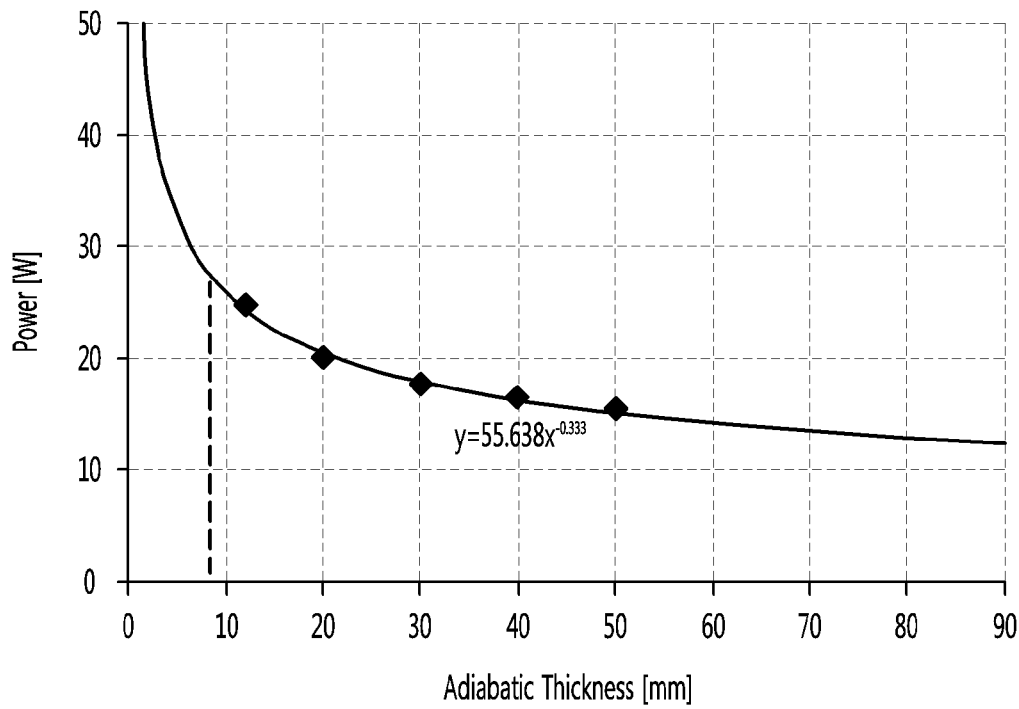
[Fig. 10]
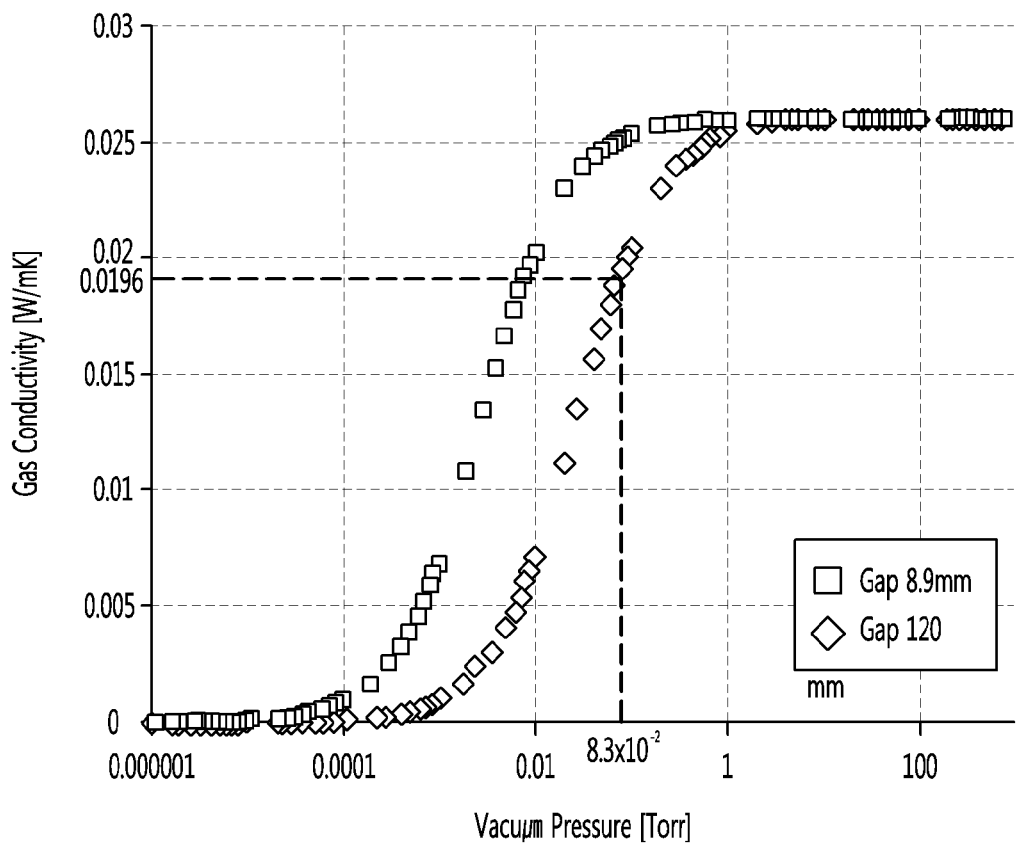

[Fig. 11]

| Vaccum Pressure | Pressure P | $k_g$ | Δk ratio[%] |
|---|---|---|---|
| 1.10E-08 | 1.47E-06 | 1.43E-07 | 8.333287504 |
| 1.00E-08 | 1.33E-06 | 1.3E-07 | 9.09086364 |
| 9.90E-09 | 1.32E-06 | 1.29E-07 | 0.99999505 |
| 9.80E-09 | 1.31E-06 | 1.27E-07 | 1.010096061 |
| 9.70E-09 | 1.29E-06 | 1.26E-07 | 1.020403215 |
| 9.60E-09 | 1.28E-06 | 1.25E-07 | 1.030922887 |
| 9.50E-09 | 1.27E-06 | 1.23E-07 | 1.041661719 |
| 9.40E-09 | 1.25E-06 | 1.22E-07 | 1.052626632 |
| 9.30E-09 | 1.24E-06 | 1.21E-07 | 1.063824841 |
| 9.20E-09 | 1.23E-06 | 1.2E-07 | 1.075263871 |
| 9.10E-09 | 1.21E-06 | 1.18E-07 | 1.086951577 |
| 9.00E-09 | 1.2E-06 | 1.17E-07 | 1.098896154 |

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2019/007761, filed Jun. 26, 2019, which claims priority to Korean Patent Application No. 10-2018-0074264, filed Jun. 27, 2018, whose entire disclosures are hereby incorporated by reference.

TECHNICAL FIELD

The present disclosure relates to a vacuum adiabatic body and a refrigerator.

BACKGROUND ART

A vacuum adiabatic body is a product for suppressing heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 mm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Cited Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam. According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US20040226956A1 (Reference Document 3). However, it is difficult to obtain a practical level of an adiabatic effect by providing a wall of the refrigerator with sufficient vacuum. In detail, there are limitations that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

The present applicant has proposed a Korean Patent Application No. 10-2015-0109627 (Cited Document 4), titled vacuum adiabatic body and refrigerator. According to this technology, a vacuum adiabatic body that is capable of being applied to an actual refrigerator is disclosed. Also, Cited Document 4 discloses a pitch of a bar of a supporting unit disposed inside a vacuum adiabatic body.

A resins used in the manufacture of the support unit is a main factor causing outgas sing, and use of expensive resin materials leads to an increase in manufacturing costs.

DISCLOSURE OF INVENTION

Technical Problem

Embodiments provide a configuration of a supporting unit in which an amount of resin required for an operation of a vacuum adiabatic body is minimally used.

Embodiments also provide a method in which a pitch of a bar applied to a supporting unit is proposed.

Embodiments also provide a vacuum pressure and an adiabatic thickness at which adiabatic efficiency of a vacuum adiabatic body is improved.

Solution to Problem

In one embodiment, a vacuum adiabatic body includes: a heat resistance unit configured to reduce a heat transfer amount between a first plate member and a second plate member; and a supporting unit configured to maintain a vacuum space part, wherein the supporting unit includes a plurality of bars extending in a vertical direction between the first plate member and the second plate member, and when a pitch of the bar is a, an elastic modulus of a material forming the bar is E, and a radius of a long axis is n and a radius of a short axis is m when a cross-section of the bar has an elliptical shape is n, the following equation:

$$1.0354 < \frac{Em^3 n}{a^2} < 188.2097$$

is satisfied. According to an embodiment, a basic method of providing the pitch between the bars of the vacuum adiabatic body may be provided to obtain an stable interval of the bars.

The heat resistance unit may include a conductive resistance sheet that resists conduction of heat transferred along a wall of a vacuum space part and may further include a side frame coupled to the conductive resistance sheet.

Also, the heat resistance unit may include at least one radiation resistance sheet that is provided in a plate shape within the vacuum space part or may include a porous material that resists radiation heat transfer between the second plate member and the first plate member within the vacuum space part.

Advantageous Effects of Invention

Since the amount of resin required for the operation of the vacuum adiabatic body is minimally used, the economical feasibility may be superior.

The pitch of the bar applied to the supporting unit may be optimally proposed to lead to the stable action of the supporting unit while suppressing the excessive use of the resin.

According to the embodiments, the adiabatic efficiency of the vacuum adiabatic body may be improved.

BRIEF DESCRIPTION OF DRAWINGS

FIG. 1 is a perspective view of a refrigerator according to an embodiment.

FIG. 2 is a view schematically showing a vacuum adiabatic body used in a main body and a door of the refrigerator.

FIGS. 3(a)-(c) are views illustrating various embodiments of an internal configuration of a vacuum space part.

FIGS. 4(a)-(c) are views illustrating various embodiments of conductive resistance sheets and peripheral portions thereof.

FIG. 5 is a view of a remodeled bar.

FIG. 6 is a cross-sectional view of the bar.

FIG. 7 is a reference view for explaining a pressure per unit area, which is applied to a unit bar.

FIG. 8 illustrates graphs showing changes in adiabatic performance and changes in gas conductivity with respect to vacuum pressures by applying a simulation.

FIG. 9 is a graph showing consumption efficiency of the refrigerator depending on an adiabatic thickness according to a simulation, i.e., a graph showing power consumption for a vacuum adiabatic thickness of a pollux model in which the efficiency of the power consumption is best.

FIG. 10 is a graph of gas thermal conductivity of 0.0089 m and 0.12 m, which are minimum and maximum values of the adiabatic thickness of the vacuum adiabatic body.

FIG. 11 is table obtained by simulating gas thermal conductivity while changing a vacuum pressure when the adiabatic thickness is about 0.12 m.

MODE FOR THE INVENTION

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings shown below may be displayed differently from the actual product, or exaggerated or simple or detailed parts may be deleted, but this is intended to facilitate understanding of the technical idea of the present invention. It should not be construed as limited.

In the following description, the vacuum pressure means any pressure state lower than the atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or slidably movably disposed to open/close the cavity 9. The cavity 9 may provide at least one of a refrigerating compartment and a freezing compartment.

Parts constituting a freezing cycle in which cold air is supplied into the cavity 9. In detail, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member 10 for providing a wall of a low-temperature space, a second plate member 20 for providing a wall of a high-temperature space, a vacuum space part 50 defined as a gap part between the first and second plate members 10 and 20. Also, the vacuum adiabatic body includes the conductive resistance sheets 60 and 63 for preventing thermal conduction between the first and second plate members 10 and 20. A sealing part 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine room 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are thermal conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet that resists conduction of heat transferred along a wall of a third space and may further include a side frame coupled to the conductive resistance sheet. The conductive resistance sheet and the side frame will be clarified by the following description.

Also, the heat resistance unit may include at least one radiation resistance sheet that is provided in a plate shape within the third space or may include a porous material that resists radiation heat transfer between the second plate member and the first plate member within the third space. The radiation resistance sheet and the porous material will be clarified by the following description.

FIG. 3 is a view illustrating various embodiments of an internal configuration of the vacuum space part.

First referring to FIG. 3A, the vacuum space part 50 may be provided in a third space having a pressure different from that of each of the first and second spaces, preferably, a vacuum state, thereby reducing an adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of thermal conduction, caused by contact between the plate members 10 and 20.

The supporting unit 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

The supporting unit 30 may be made of a resin selected from PC, glass fiber PC, low outgassing PC, PPS, and LCP to obtain high compressive strength, a low outgassing and water absorption rate, low thermal conductivity, high compressive strength at a high temperature, and superior processability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet, at least two radiation resistance sheets 32 may be provided at a certain distance so as not to contact each other. Also, at least one radiation resistance sheet may be provided in a state in which it contacts the inner surface of the first or second plate member 10 or 20.

Referring back FIG. 15B, the distance between the plate members is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Referring to FIG. 3C, the supporting unit 30 for maintaining the vacuum space part 50 may not be provided. A porous material 333 may be provided to be surrounded by a film 34 instead of the supporting unit 30. Here, the porous material 33 may be provided in a state of being compressed so that the gap of the vacuum space part is maintained. The film 34 made of, for example, a PE material may be provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

FIG. 4 is a view illustrating various embodiments of conductive resistance sheets and peripheral parts thereof. Structures of the conductive resistance sheets are briefly illustrated in FIG. 2, but will be understood in detail with reference to the drawings.

First, a conductive resistance sheet proposed in FIG. 4A may be preferably applied to the main body-side vacuum adiabatic body. Specifically, the first and second plate members 10 and 20 are to be sealed so as to vacuumize the interior of the vacuum adiabatic body. In this case, since the two plate members have different temperatures from each other, heat transfer may occur between the two plate members. A conductive resistance sheet 60 is provided to prevent thermal conduction between two different kinds of plate members.

The conductive resistance sheet 60 may be provided with the sealing part 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 610 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 610 are not limited to the welding parts, and may be provided through a process such as cocking. The conductive resistance sheet 60 may be provided in a curved shape. Thus, a thermal conduction distance of the conductive resistance sheet 60 is provided longer than the linear distance of each plate member, so that the amount of thermal conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the refrigerator, the second plate member 20 has a high temperature and the first plate member 10 has a low temperature. In addition, thermal conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous material or a separate adiabatic structure.

A conductive resistance sheet proposed in FIG. 4(*b*) may be preferably applied to the door-side vacuum adiabatic body. In FIG. 4(*b*), portions different from those of FIG. 4(*a*) are described in detail, and the same description is applied to portions identical to those of FIG. 4(*a*). A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. In more detail, if the conductive resistance sheet 60 is placed at the front end portion of the vacuum space part, the corner edge portion of the door is exposed to the exterior, and hence there is a disadvantage in that a separate adiabatic part should be configured so as to thermally insulate the conductive resistance sheet 60.

A conductive resistance sheet proposed in FIG. 4(*c*) may be preferably installed in the pipeline passing through the vacuum space part. In FIG. 4(*c*), portions different from those of FIGS. 4(*a*) and 4(*b*) are described in detail, and the same description is applied to portions identical to those of FIGS. 4(*a*) and 4(*b*). A conductive resistance sheet having the same shape as that of FIG. 4(*a*), preferably, a wrinkled conductive resistance sheet 63 may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 4(*a*). Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②), the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat} \quad [\text{Math.1}]$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT. Here, Q denotes a calorific value (W) and may be obtained using a calorific value of a heater. A denotes a sectional area ($m^2$) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be the largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength ($N/m^2$) of a certain level may be preferably used.

Under such circumstances, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may be bad influence on the external appearance of refrigerator. The radiation resistance sheet 32 may be preferably made of a material that has a low emissivity and may be easily subjected to thin film processing. Also, the radiation resistance sheet 32 is to ensure a strength enough not to be deformed by an external impact. The supporting unit 30 is provided with a strength enough to support the force by the vacuum pressure and endure an external impact, and is to have machinability. The conductive resistance sheet 60 may be preferably made of a material that has a thin plate shape and may endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. Lastly, the conductive resistance sheet may be preferably made of a material that is easily deformed by the vacuum pressure and has the lowest stiffness.

Even when the porous material 33 is filled in the vacuum space part 50, the conductive resistance sheet may preferably have the lowest stiffness, and the plate member and the side frame may preferably have the highest stiffness.

Hereinafter, a configuration and characteristic of the supporting unit and a pitch of the bar will be described. The pitch of the bar 31 may affect a cross-sectional shape of the bar, a length of the bar, a material of the bar, and a vacuum pressure. In addition, the pitch of the 31 may affect a material and thickness of the plate member. However, the plate member may apply a static load to the bar on a thin and large area, and thus, the plate member may not have a great influence on the pitch of the bar.

The inventor has found that the pitch of the bar is defined by a predetermined relationship based on the fact that the bar 31 withstands limit buckling stress that does not break even by the stress due to the vacuum pressure of the vacuum adiabatic body. This will be described below.

FIG. 5 is a view illustrating a state in which the bar is remodeled, and FIG. 6 is a cross-sectional view of the bar.

Referring to FIG. 5, a buckling load of the bar is given by $$F_{cr} = \frac{\pi^2 EI}{L^2}.$$

Here, Fcr is the buckling load of the bar, L is a length of the bar, I is inertia moment, and E is an elastic modulus of a material of the bar. Also, the inertia moment of an elliptical column is given by $$I_x = \frac{\pi m^3 n}{4} \text{ and}$$

$$I_y = \frac{\pi m n^3}{4}$$

in x-axis and y-axis directions. When a cross-section of the bar is elliptical, the inertia moment in a direction in which the highest buckling load applied to the bar without damage is applied will be Ix. This is because m is less than n, and buckling is performed in the x direction.

When introducing the inertia moment in the x direction into the equation of the buckling load of the bar, Equation 2 is proposed.

$$F_{cr} = \frac{\pi^3 Em^3 n}{4L^2} = \frac{\pi^3}{4}\left(\frac{Em^3 n}{L^2}\right) \quad [\text{Math.2}]$$

Where Fcr is a buckling load of the bar, L is a length of the bar, I is inertia moment, E is an elastic modulus of a material providing the bar, m is a short-axis radius of a cross-section of the bar, and n is a long-axis radius of the cross-section of the bar. The length L of the bar may be equal to an adiabatic thickness of a vacuum adiabatic body.

Buckling stress is a value obtained by dividing the buckling load by the cross-section of the bar and may be given by Equation 3.

$$\sigma_{cr} = F_{cr}/A = \frac{\pi^3}{4}\left(\frac{Em^3 n}{L^2}\right)/(\pi m n) = \frac{\pi^2 m^2 E}{4L^2} \quad [\text{Math.3}]$$

Where $\alpha_{cr}$ is a buckling load, Fcr is a buckling load of the bar, A is a cross-sectional area of the bar, L is a length of the bar, I is inertia moment, E is an elastic modulus of a material providing the bar, m is a short-axis radius of a cross-section of the bar, and n is a long-axis radius of the cross-section of the bar.

As seen through Equation 3, if the stress applied to the bar exceeds a, the bar may be broken.

Stress per unit area on which the stress according to the pressure applied to the bar is applied to a unit bar illustrated in FIG. 7 will be described with reference to the reference view.

Referring to FIG. 7, when an intervals between the pitches of the bars 31 are the same in the left and right direction, the pressure applied to the unit area provided at the interval of the bars may be considered to be the same as the pressure applied to the unit bar.

Thus, the stress applied to the individual bars 31 may be given by Equation 4.

$$\sigma_{nomal} = \frac{Pa^2}{\pi m n} \quad [\text{Math.4}]$$

Where $\alpha_{normal}$ is vacuum stress applied to the bar by the pressure, a is pitch of the bar, and P is a pressure applied to the unit area.

Buckling stress and a pressure applied to the bar according to Equation 4 may have the same value. That is to say, when a vacuum stress due to a vacuum pressure inside the vacuum adiabatic body reaches the buckling stress, the bar may be broken. This is summarized in Equation 5 as follows.

$$\frac{\pi^2 m^2 E}{4L^2} = \frac{Pa^2}{\pi m n} \quad [\text{Math.5}]$$

Where L is a length of the bar, E is an elastic modulus of a material providing the bar, m is a short-axis radius of a cross-section of the bar, n is a long-axis radius of the cross-section of the bar, a is a pitch of the bar, P is a pressure applied to plate members 10 and 20, i.e., a value obtained by subtracting a pressure of a vacuum space part from an atmospheric pressure.

Equation 5 may be modified as shown in Equation 6.

$$\frac{Em^3 n}{a^2} = \frac{4PL^2}{\pi^2} \quad [\text{Math.6}]$$

Equation 6 corresponds to the sum of elements of a cross-sectional area of the bar and an elastic modulus of the bar on a left side in Equation 5.

When the pressure applied to the vacuum adiabatic body on a right side and a length of the bar (a thickness of the heat adiabatic body) are determined, a cross-sectional shape of the bar, which is another element, and a material of the bar have a proportional relation that is determined according to each index.

The following facts become clear through the above Equation 6.

First, when the other conditions are the same, for safety, the square of the pitch of the bar has to be in proportional to the square root of the pressure exerted on the plate member.

Second, when the other conditions are the same, for safety, the pitch of the bar has to be in inverse proportion to the length of the bar.

Third, when the other conditions are the same, for safety, the pitch of the bar has to be in inverse proportion to the square root of the elastic modulus of the bar material.

Fourth, when the other conditions are the same, the pitch of the bars should be in inverse proportion to an index of 3/2 on the long axis of the elliptical cross-section of the bar.

Fifth, when the other conditions are the same, the pitch of the bar has to be in inverse proportion to the square root of the short axis of the elliptical cross-section of the bar.

Sixth, when the other conditions are the same, the pitch of the bar has to be in inverse proportion to the area of the cross-section when the cross-section of the bar is a circle.

Seventh, when the other conditions are the same, the pitch and cross-sectional shape of the bars may be determined with a predetermined mutual relationship as long as the adiabatic thickness of the vacuum adiabatic body and the width of the vacuum pressure are determined.

Referring to Equation 6, it is seen that maximum/minimum values of the adiabatic thickness of the vacuum adiabatic body and maximum/minimum values of the pressure applied to the vacuum adiabatic body are obtained so as to obtain the highest adiabatic efficiency by the vacuum adiabatic body. Hereinafter, a process of obtaining the maximum/minimum values of the adiabatic thickness of the vacuum adiabatic body and the maximum/minimum values of the pressure applied to the vacuum adiabatic body will be described.

FIG. 8 illustrates graphs showing changes in adiabatic performance and changes in gas conductivity with respect to vacuum pressures by applying a simulation.

Referring to FIG. 8, it may be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it may be seen that the degree of improvement of the adiabatic performance is gradually lowered. Also, it may be seen that, as the vacuum pressure is decreased, the gas conductivity (Graph 3) is decreased. However, it may be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter.

The more the adiabatic thickness increases, the more the increase of the adiabatic efficiency is better, but the more the adiabatic thickness increases, the more the internal space of the refrigerator is reduced.

The lowest value of the adiabatic thickness of the vacuum adiabatic body will be described under the above background.

FIG. 9 is a graph showing consumption efficiency of the refrigerator depending on an adiabatic thickness according to a simulation, i.e., a graph showing power consumption for a vacuum adiabatic thickness of a pollux model in which the efficiency of the power consumption is best.

First, the minimum value of the thickness of the vacuum adiabatic body is considered as about 4 mm, which is a physical limit of the getter size disposed inside the vacuum adiabatic body. However, the size of the getter may not only be reduced but also the power consumption is excessively large.

Even through an effect of improving the adiabatic performance to be obtained by using the vacuum adiabatic body is obtained, if the power consumption is excessively large, a good effect may not be obtained even compared with the refrigerator using the foamed urethane according to the related art. Under this background, the inventor has found that when the adiabatic thickness becomes smaller than a point at which the inclination becomes −1 in the graph shown in FIG. 9, the power consumption increases sharply. In the graph, the thickness is 8.9 mm as the lowest value of the adiabatic thickness. Of course, if the adiabatic thickness at the point where the inclination is −1 in the graph, the improvement of the power consumption gradually decreases.

As a result of the above discussion, the minimum thickness of the vacuum adiabatic body may be determined to be about 8.9 mm (0.0089 m).

As the thickness of the vacuum adiabatic body increases, the adiabatic efficiency is improved, but the internal volume of the refrigerator decreases, which is not preferable. Under this background, a case in which the thickness of the vacuum adiabatic body is substantially the same as that in the case of using the refrigerator body using the foamed urethane according to the related art may be set as the maximum thickness of the vacuum adiabatic body.

At present, the most efficient refrigerator body is about 1,500 liters in size, and the internal volume of the refrigerator is about 900 liters. Also, the refrigerator wall has capacity of about 600 liters. When assuming that each side of the body is provided as a square, the thickness of the five sides excluding the door is about 0.12 m.

As a result of the above discussion, the maximum thickness of the vacuum adiabatic body may be determined to be about 0.12 m.

As illustrated in FIG. 8, the more the vacuum pressure of the vacuum adiabatic body decreases, the more the gas thermal conductivity decreases to improve the adiabatic performance, and the more the vacuum pressure increases, the more the gas thermal conductivity increases to deteriorate the adiabatic performance.

The minimum value of the adiabatic performance that is tolerated may be considered as a case of providing the adiabatic body by foaming the polyurethane according to the related art. FIG. 10 is a graph of gas thermal conductivity of 0.0089 m and 0.12 m, which are minimum and maximum values of the adiabatic thickness of the vacuum adiabatic body.

Referring to FIG. 10, the maximum value of the adiabatic thickness of the vacuum adiabatic body may be $8.3 \times 10^{-2}$ Torr when the adiabatic thickness at which the thermal conductivity of polyurethane is 0.0196 W/mK is 0.0089 m.

On the basis of the above, the maximum value of the vacuum pressure may be determined to be $8.3 \times 10^{-2}$ Torr.

The lowest value of the vacuum pressure of the vacuum adiabatic body is preferable due to the lower gas thermal conductivity as the vacuum pressure is lower. However, as an exhaust time becomes longer, and the vacuum pressure decreases below a certain level, the improvement effect of the gas heat conduction is insignificant.

Under the above background, it is possible to determine the vacuum pressure when a degree of improvement of the gas thermal conductivity becomes small as the vacuum pressure is gradually lowered by a constant value. The constant value for lowering the vacuum pressure is determined as $0.1^{-n}$, and the width is narrowed as the index increases to a negative value. This is because, as for the exhaust, the index is grown to the negative value, and the exhaust time becomes longer. For example, a simulation with respect to the degree of improvement of the gas thermal conductivity according to the vacuum pressure in order of 1.1E-07⇒1.0E-07⇒9.9E-08⇒9.8E-08⇒9.7E-08.

Even when the gas thermal conductivity is the same, the vacuum pressure is lowered when the adiabatic thickness of the vacuum adiabatic body is large. Thus, the adiabatic thickness of the vacuum adiabatic body may be based on 0.12 m, which is the thickest. Here, the gas thermal conductivity uses $$k_g = \frac{k_{g,0}}{1 + \frac{0.032}{P \cdot \Phi}}.$$

This equation may be applied to all types of gas heat conductivity.

FIG. 11 is table obtained by simulating gas thermal conductivity while changing a vacuum pressure when the adiabatic thickness is about 0.12 m. Referring to FIG. 11, the degree of improvement of the gas thermal conductivity is dropped to about 1% or less when the vacuum pressure is $9.9 \times 10^{-9}$ Torr.

On the basis of the above, the minimum value of the vacuum pressure may be determined to be $9.9 \times 10^{-9}$ Torr.

As a result of the above investigation, the maximum/minimum values of the adiabatic thickness of the vacuum adiabatic body is 0.12 m and 0.0089 m, respectively, and the maximum/minimum values of the vacuum pressure of the vacuum adiabatic body is $8.3 \times 10^{-2}$ Torr and $9.9 \times 10^{-9}$ Torr, respectively.

This result may be substituted into Equation 6. The pressure applied to the unit area before this is to be subtracted from the vacuum pressure of the vacuum adiabatic body at an atmospheric pressure. When subtracting $8.3 \times 10^{-2}$ Torr (11.0666 Pa) and $9.9 \times 10^{-9}$ Torr ($1.32 \times 10^{-6}$ Pa) at the atmospheric pressure of 101,325 Pa, 101,313.933 Pa and 101,325 Pa may be obtained, respectively.

As a result, in Equation 6, the maximum/minimum values of the adiabatic thickness L of the vacuum adiabatic body are 0.12 m and 0.0089 m, respectively, and the maximum/minimum values of the pressure P applied to the unit area may use 101,313.9334 Pa and 101,325 Pa.

If the above value is substituted into Equation 6, the value of Equation 7 may be obtained.

$$1.0354 < \frac{Em^3 n}{a^2} < 188.2097 \qquad \text{[Math.7]}$$

In this case, each pitch a of the bars has to be larger than twice the short axis of the elliptical shape of the bar and twice the long axis.

The assignment of the concrete numerical values yielding the result of Equation 7 is expressed by Equation 8.

$$\frac{4 \cdot (101313.9334) - (0.0089)^2}{\pi} < \frac{Em^3 n}{a^2}[N] < \frac{4 \cdot (101325) - (0.12)^2}{\pi^3} \qquad \text{[Math.8]}$$

Referring to Equation 8, since the vacuum pressure is lowered when the adiabatic thickness of the adiabatic body is large (0.12), the pressure applied to the unit area becomes larger (101,325). As a result, it is seen that the results of Equation 8 is divided into the time when the adiabatic thickness is large, and the time when the insulation thickness is small.

If the bar has a circular shape, m and n are the same value, and the median value of Equation 7 may be changed to $Er^4/a^2$ (where r is a radius of the bar). The cross-section of the bar may preferably be provided in the circular shape for convenience of injection.

According to Equation 7, the cross-sectional area of the bar and the pitch between bars are proportional to each other depending on a predetermined index.

According to the above description, the supporting unit of the vacuum adiabatic body may be applied by using the relationship between the material of the bar and the cross-sectional shape of the bar and the pitch of the bar.

When applying Equation 7, when one element is enlarged, it is possible to positively control through correlation with other elements.

It is of course possible to further enhance the safe use of the supporting unit by using Equation 7 and additionally adding the safety factor.

Although Equation (7) assumes that there is nothing in the vacuum space part, if the porous material is contained in the vacuum space part, it may be sufficiently applied for a basic safety check.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

INDUSTRIAL APPLICABILITY

According to the embodiments, the supporting unit applicable to the vacuum adiabatic body may be designed more safely. It is possible to obtain the vacuum adiabatic body and the refrigerator which are closer to industrial use such as the refrigerator or the like according to the embodiments. Therefore, urgent industrial application may expected positively.

The invention claimed is:
1. A vacuum adiabatic body comprising:
a first plate configured to define at least a portion of a wall for a first space;
a second plate configured to define at least a portion of a wall for a second space;
a third space provided between the first plate and the second plate and configured as a vacuum space; and
a plurality of bars provided in the third space and configured to maintain a distance between the first plate and the second plate,
wherein an equation:

$$1.0354 < \frac{Em^3n}{a^2} < 188.2097$$

is satisfied by the plurality of bars, and
wherein:
a is a distance between two adjacent ones of the bars,
E is an elastic modulus of a material forming the bars,
n is a radius of a long axis of a cross-section shape of the bars, and
m is a radius of a short axis of the cross-section shape of the bars.

2. The vacuum adiabatic body according to claim 1, wherein the third space has a thickness of at least 4 mm in a direction between the first plate and the second plate.

3. The vacuum adiabatic body according to claim 2, wherein the thickness of the third space in the direction between the first plate and the second plate is at least 8.9 mm.

4. The vacuum adiabatic body according to claim 1, wherein the third space has a thickness in a direction between the first plate and the second plate that is less than or equal to 0.12 m.

5. The vacuum adiabatic body according to claim 1, wherein the third space has a vacuum pressure that is less than or equal to $8.3 \times 10^{-2}$ Torr.

6. The vacuum adiabatic body according to claim 1, wherein the third space has a vacuum pressure of at least $9.9 \times 10^{-9}$ Torr.

7. The vacuum adiabatic body according to claim 1, wherein a square of the distance (a) between the two adjacent bars changes in proportion to a square root of a pressure applied to one of the first plate or the second plate.

8. The vacuum adiabatic body according to claim 1, wherein the distance (a) between the two adjacent bars changes in inverse proportion to a length of the bar in a direction between the first plate and the second plate.

9. The vacuum adiabatic body according to claim 1, wherein the distance (a) between the two adjacent bars changes in inverse proportion to a square root of the modulus of elasticity (E) of the material forming the bar.

10. The vacuum adiabatic body according to claim 1, wherein the distance (a) between the two adjacent bars changes in inverse proportion to a 3/2 power of the radius (n) of the long axis of the bar.

11. The vacuum adiabatic body according to claim 1, wherein the distance (a) between the two adjacent bars changes in inverse proportion to a square root of the radius (m) of the short axis of the bar.

12. The vacuum adiabatic body according to claim 1, wherein the distance (a) between the two adjacent bars changes in inverse proportion to an area of the cross-section shape when the bar has a circular cross-section shape.

13. The vacuum adiabatic body according to claim 1, further comprising a support provided to contact at least one of the first plate or the second plate and one end of at least one of the bars.

14. A refrigerator comprising:
a main body having a vacuum adiabatic body to form an internal space configured to store items;
a door provided to open and close the main body to allow access to the internal space from an external space;
a compressor configured to compress a refrigerant;
a condenser configured to condense the compressed refrigerant;
an expansion device configured to expand the condensed refrigerant; and
an evaporator configured to evaporate the expanded refrigerant so as to dissipate heat,
wherein the vacuum adiabatic body includes:
a first plate configured to define at least a portion of a wall for the internal space;
a second plate configured to define at least a portion of a wall for the external space;
a vacuum space provided between the first plate and the second plate; and
a plurality of bars provided in the vacuum space and configured to maintain a distance between the first plate and the second plate,
wherein the vacuum space has a pressure of $8.3 \times 10^{-2}$ Torr to $9.9 \times 10^{-9}$ Torr,
wherein a first equation:

$$1.0354 < \frac{Em^3n}{a^2} < 188.2097$$

is satisfied by the bars, and
wherein:
a is a distance between two adjacent ones of the bars,
E is an elastic modulus of a material forming the bars,
n is a radius of a long axis of a cross-section shape of the bars, and
m is a radius of a short axis of the cross-section shape of the bars.

15. The vacuum adiabatic body according to claim 14, wherein:
the cross-section shape of the bar is a circle,
a second equation: $1.0354 < Er^4/a^2 < 188.2097$ is satisfied by the bars, and
r is a radius of the circle of the cross-section shape of the bar.

16. The vacuum adiabatic body according to claim 14, wherein the distance (a) between the two adjacent bars changes in inverse proportion to 3/2 power of the radius (n) of the long axis of the cross-section shape of the bar.

17. The vacuum adiabatic body according to claim 14, wherein the distance (a) between the two adjacent bars changes in inverse proportion to a square root of a radius (n) of the short axis of the bar.

* * * * *